United States Patent [19]
Hendricks

[11] Patent Number: 5,497,860
[45] Date of Patent: Mar. 12, 1996

[54] ELECTROMAGNETIC BRAKE WITH IMPROVED MAGNET STRUCTURE

[75] Inventor: Wayne D. Hendricks, Mukwonago, Wis.

[73] Assignee: Venturedyne Limited, Milwaukee, Wis.

[21] Appl. No.: 290,059

[22] Filed: Aug. 15, 1994

[51] Int. Cl.[6] .............................. F16D 65/34; F16D 55/36
[52] U.S. Cl. ...................... 188/162; 188/161; 188/71.5
[58] Field of Search ..................... 188/73.1, 73.35, 188/73.37, 250 E, 161, 163, 171; 192/84 A, 84 B, 84 R; 310/93, 103, 108; 335/273, 275, 276

[56] References Cited

U.S. PATENT DOCUMENTS

| | | | |
|---|---|---|---|
| 2,823,325 | 2/1958 | Stephan | 310/77 |
| 2,930,457 | 3/1960 | Bigelow | 188/171 |
| 3,044,593 | 1/1962 | Scarrott et al. | 192/84 |
| 3,142,214 | 7/1964 | Allen | 82/14 |
| 3,171,515 | 3/1965 | Wolfe | 188/171 |
| 3,202,244 | 8/1965 | Vogelsong et al. | 188/171 |
| 3,458,022 | 7/1969 | Reiff | 192/84 |
| 3,605,958 | 9/1971 | McCarthy | 188/171 |
| 4,014,412 | 3/1977 | Swanson et al. | 188/138 |
| 4,022,301 | 5/1977 | Hansen | 188/72.1 |
| 4,135,607 | 1/1979 | Brown et al. | 188/161 |
| 4,181,201 | 1/1980 | McCarthy | 188/171 |
| 4,235,311 | 11/1980 | Brinkmann et al. | 188/71.7 |
| 4,294,337 | 10/1981 | Wiechert | 188/171 |
| 4,445,596 | 5/1984 | Waters et al. | 188/171 |
| 4,514,711 | 4/1985 | Nagamoto et al. | 325/243 |
| 4,599,593 | 7/1986 | Minks | 335/274 |
| 4,603,760 | 8/1986 | Myers | 188/73.37 |
| 4,670,727 | 6/1987 | Muller et al. | 335/274 |
| 4,684,910 | 8/1987 | Dittmann et al. | 335/274 |
| 4,798,269 | 1/1989 | Linder et al. | 188/171 |
| 4,828,077 | 5/1989 | Stevens, Jr. | 188/171 |
| 4,966,255 | 10/1990 | Fossum | 188/71.8 |
| 4,982,825 | 1/1991 | Sekella | 192/90 |
| 5,014,828 | 5/1991 | Baldassarve | 335/273 |
| 5,035,305 | 7/1991 | Lammers | 188/250 E |
| 5,145,035 | 9/1992 | Garrido et al. | 187/20 |
| 5,186,286 | 2/1993 | Lindberg | 188/171 |
| 5,186,287 | 2/1993 | Linder | 188/171 |
| 5,274,290 | 12/1993 | Fischer | 188/161 |

Primary Examiner—Robert J. Oberleitner
Assistant Examiner—Chris Schwartz
Attorney, Agent, or Firm—Jansson & Shupe, Ltd.

[57] ABSTRACT

The disclosure relates to an electromagnetic brake mounted to and used with electric motors. Such brakes have an "E" shaped electromagnet mounted on a magnet support. An armature block is mounted on a plate and both the block and the plate move when the electromagnet is energized or de-energized. The improvement involves a magnet support of the cantilever type. Such support bends slightly when the electromagnet is energized so that the faces of the "E" magnet legs can self-align and be maintained substantially parallel with the armature block. The preferred structure also includes a resilient pad interposed between the block and the plate and at least one stop limiting compression of the pad. A special bolt securing plate hold the armature block bolts in place.

20 Claims, 6 Drawing Sheets

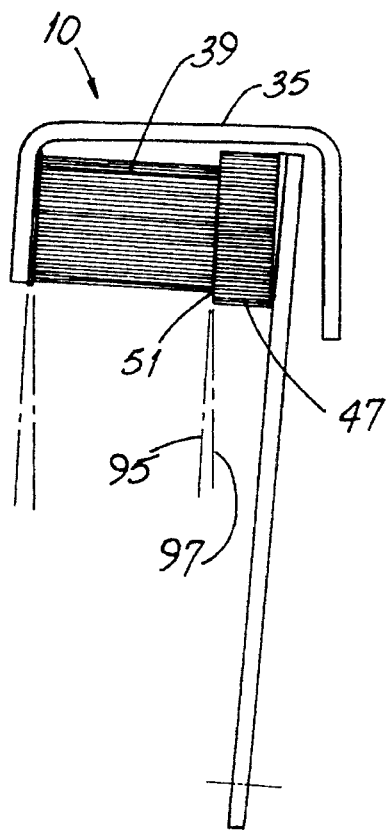
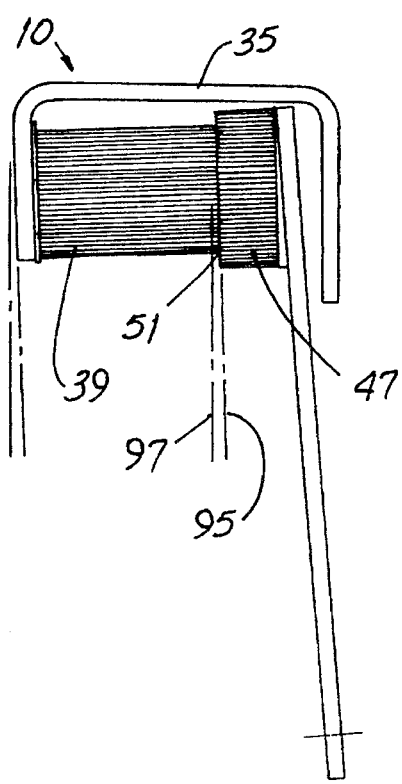
FIG. 9
FIG. 10
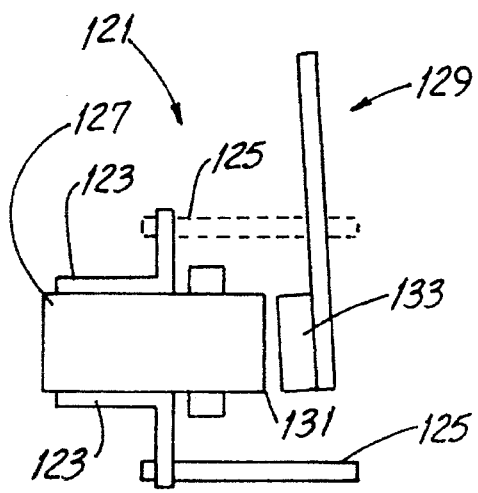
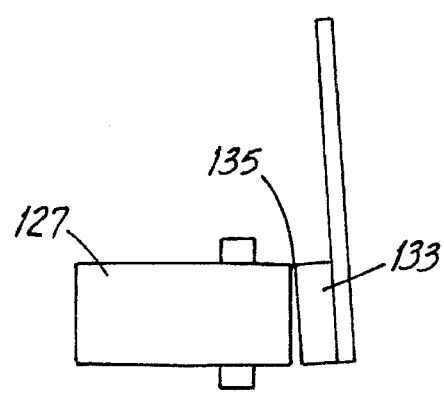
FIG. 7
PRIOR ART
FIG. 8
PRIOR ART

ELECTROMAGNETIC BRAKE WITH IMPROVED MAGNET STRUCTURE

FIELD OF THE INVENTION

This invention relates generally to electromagnets and, more particularly, to electromagnets of the type having a moving armature structure.

BACKGROUND OF THE INVENTION

Broadly speaking, there are two kinds of magnets, namely, permanent magnets and electromagnets. Magnets of the former type are made of a material which is permanently magnetized. Such magnets are devoid of windings and require no external source of power to produce a magnetic field. And neither can they be easily "turned off."

On the other hand, electromagnets have a ferrous core wound with a coil of wire through which electric current is passed for creating a magnetic field. The magnetic field persists so long as electric current persists; clearly, electromagnets may easily be turned on and off by controlling the electrical power to which the coil of wire is connected. The invention involves a magnet of the latter type and, particularly, involves an alternating current (AC) electromagnet with a moving armature structure, both as used with an AC electric motor.

Electric motors are often used to drive conveyors, door openers, cranes and the like. Often, the driven machine requires rapid stopping and load-holding when no electrical power is being applied to the motor. The seemingly-inconsistent requirements of driving power on the one hand and rapid load-stopping and good load-holding on the other are met by an electric motor which has a spring-set, electromagnetically-released disc brake mounted with the motor, usually in a common housing.

A disc brake of this type has one or more "pancake-like" friction discs, each with a center opening splined or otherwise attached to the motor shaft and rotating with such shaft. Stationary ring-like discs are keyed to the housing to prevent such discs from rotating and are alternately stacked with the friction discs.

When the electromagnet is de-energized, springs urge the friction discs (which are splined to and rotate with the motor shaft) and ring-like discs (which are prevented from rotating) against one another. The motor is thereby brought to a rapid stop. Further, the motor and the "load" attached to it, e.g., a conveyor or the like, are held in the stopped position. When the motor is again energized, the brake electromagnet is also energized and compresses the brake-applying springs to release the brake and permit the motor to rotate freely. A foremost manufacturer of magnetic disc brakes used with electric motors is Dings Company of Milwaukee, Wis.

Motors combined with electromagnetic brakes are depicted in a number of prior art patents and U.S. Pat. Nos. 4,022,301 (Hansen); 4,7698,269 (Lindner et al.) and 5,186,287 (Lindner et al.) are exemplary. The electromagnet arrangement depicted in the Lindner et al. patents use what is often referred to as a "T" type electromagnet. Electromagnets of such type are so named because the armature, that moving portion drawn toward and into contact with the electromagnet when such electromagnet is energized, is shaped like the letter "T."

Another common type is known as an "E" type and has an electromagnet shaped like the letter "E." The armature is a rectangular block and its flat face is drawn toward and into contact with the flat end faces of the three "legs" of the electromagnet when the latter is energized. The invention involves an electromagnet of the "E" type.

In a known electromagnetic brake of the "E" type, the armature is rigidly attached to and forms part of an armature plate assembly. Such assembly includes a substantially flat plate with the armature block mounted near one end. As the electromagnet is energized and deenergized, the armature plate assembly pivots very slightly about the end opposite the armature block as the armature block is alternately attracted to and released from the "E" magnet.

When new, the armature block is adjusted (or should be adjusted) so that the magnet-contacting surface of such block is parallel to the faces of the electromagnet. If that is not done, there is an audible AC "hum" when the magnet is energized since the surface of the armature block contacting the faces of the magnet legs is not parallel to such faces. In a more extreme case, such sound can be quite annoying. And since the "E" magnet is rigidly mounted on support studs or the like, there is no opportunity for self-alignment of the faces of the "E" magnet legs to the armature block.

One approach to solving the noise problem involves a "floating" mount arrangement. The armature block is loosely attached to the armature assembly plate by bolts through large-clearance holes in the plate and through holes in a resilient pad interposed between the block and the plate. The block is quite free to tilt with respect to the plate and, it is reasoned, free to align itself parallel with the faces of the "E" magnet legs.

However, it was found that initial contact of the armature block with such faces was in the nature of a "line" contact rather than an "area" contact. As a result, the block face was "Brinnelled" (hardened by impact) and the assembly was noise-free for only a few hundred thousand cycles of brake operation.

And there are other problems with known electromagnetic brake magnet structures. Over an extended time, such structures endure a good deal of "hammering" (as the magnet is repeatedly energized and de-energized) and bolts holding the armature block to the armature plate often loosen. Known efforts to prevent bolt loosening include applying Loc-Tite® holding compound but even this has not been uniformly successful. Some have resorted to welding to prevent the armature block from loosening.

Yet another problem with known electromagnetic brake magnet structures is that they are relatively expensive to build. Of course, reductions in the cost of such structures would help the manufacturer realize a greater return on investment and/or provide the purchaser with an incrementally lower cost unit.

A structure which significantly reduces AC "hum" in an electromagnetic brake over an extended operating life, which securely retains armature block mounting bolts and which is less expensive to manufacture would be an important advance in the art.

OBJECTS OF THE INVENTION

It is an object of the invention to provide an electromagnetic brake with an improved magnet structure overcoming some of the problems and shortcoming of the prior art.

Another object of the invention is to provide an electromagnetic brake with an improved magnet structure exhibiting very low AC hum.

Yet another object of the invention is to provide an electromagnetic brake with an improved magnet structure which is quiet over an extended number of operating cycles.

Another object of the invention is to provide an electromagnetic brake with an improved magnet structure permitting self-alignment of the surface of the armature block and the faces of the "E" magnet legs.

Another object of the invention is to provide an electromagnetic brake with an improved magnet structure which helps avoid impact hardening of electromagnet parts.

Another object of the invention is to provide an electromagnetic brake with an improved magnet structure in which armature block mounting bolts are securely retained.

Still another object of the invention is to provide an electromagnetic brake with an improved magnet structure wherein the importance of adjusting the armature block parallel to the magnet face is substantially reduced.

Another object of the invention is to provide an electromagnetic brake with an improved magnet structure which is less expensive to manufacture than comparable prior art structures. How these and other objects are accomplished will become more apparent from the following descriptions and from the drawing.

SUMMARY OF THE INVENTION

The invention involves an electromagnetic brake apparatus of the type which includes (a) an electromagnet mounted on a magnet support and having a magnet face, and (b) an armature block mounted for movement with respect to the electromagnet. The magnet face is generally coincident with a reference plane when the magnet is deenergized.

In the improvement, the magnet support is of the cantilever type and is able to bend slightly. When the electromagnet is energized, the magnet face and armature block can therefore become parallel to one another even though the armature block is at a position (usually because of misadjustment) at which such parallelism would not be possible but for the bending magnet support. When such support bends, the magnet face is at an angle to a first reference plane with which such face is coincident when the support is not bent. The armature block is also at an angle to such reference plane. Misalignment between the electromagnet and the block is reduced at the instant of electromagnet energization and through the time the block comes into full surface contact with the face of the electromagnet.

The magnet support has a foot-like mounting portion, a support web extending from the mounting portion and a cantilever lip extending from the support web. Such lip has the electromagnet attached thereto. In a highly preferred embodiment, the mounting portion, the support web and the cantilever lip define a generally C-shaped structure having an open mouth portion and the electromagnet is in the open mouth portion.

The armature block is mounted on an armature plate, thereby forming an armature assembly and a resilient pad is interposed between the block and the plate. In another aspect of the invention, it has been found advantageous to include in the assembly at least one stop limiting compression of the pad. In a highly preferred arrangement, the stop comprises a body portion extending part way through the pad. The pad has an uncompressed thickness which is slightly greater than the length of the body portion.

It is to be appreciated that the armature assembly involving the stop to limit pad compression can be used independently of the C-shaped magnet support structure. Each aspect contributes to magnet face/armature block parallelism after magnet energization. On the other hand, the new structure is most effective in reducing AC hum when both aspects are used in the same electromagnet.

The armature block is mounted on an armature plate and the plate and the block are secured to one another by at least one bolt which has a head with a torque-transmitting shape, e.g., square or hexagon. In yet another aspect of the invention, the assembly also includes a bolt securing plate having an opening in registry with the bolt head and preventing bolt rotation. Preferably, there are two bolts and the bolt heads and the openings in the securing plate are conformably shaped. Other details of the new apparatus are set forth in the following detailed description and in the drawing.

BRIEF DESCRIPTION OF THE DRAWING

FIG. 7 is a simplified side view of a prior art magnet, magnet support structure and armature assembly with the magnet de-energized. Portions are shown in dashed outline.

FIG. 8 is a simplified side view of a portion of the arrangement of FIG. 7 shown with the magnet energized.

FIGS. 9 and 10 are representative side elevation views showing the beneficial effect of the new apparatus.

DETAILED DESCRIPTION OF PREFERRED EMBODIMENTS

Before describing details of the inventive apparatus 10, it will be helpful to have an understanding of how such apparatus 10 is used in conjunction with an electric motor. It will also be helpful to appreciate how the apparatus 10 is configured to stop a motor when the motor is de-energized. Such explanations follow.

Figure 1:
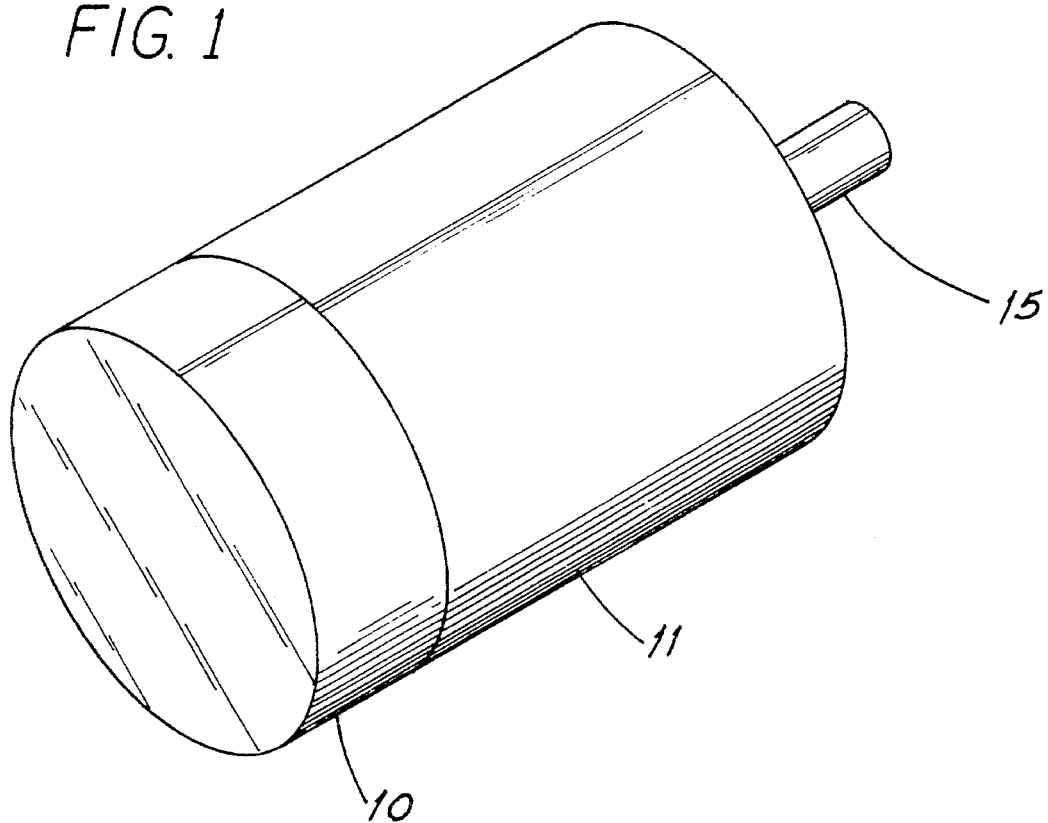
FIG. 1 is an isometric view of the new apparatus shown in conjunction with an electric motor.
Figure 2:
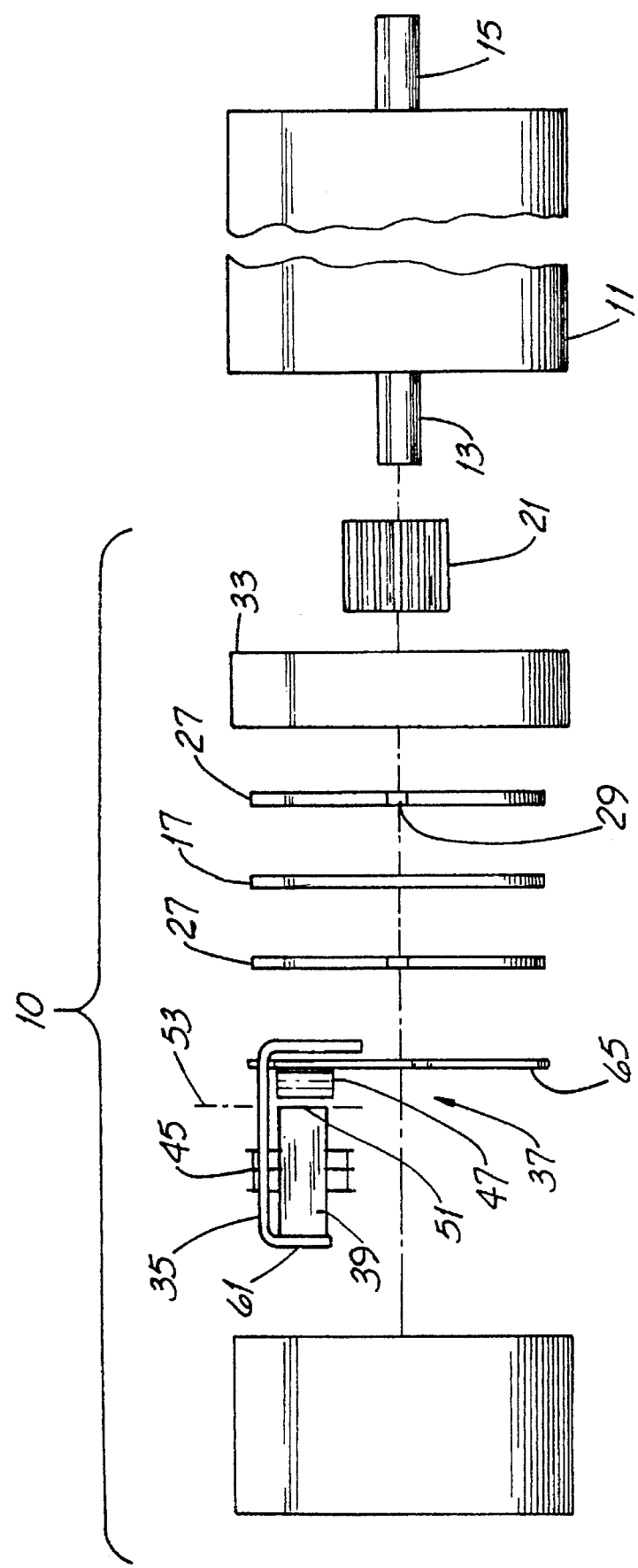
FIG. 2 is an exploded side elevation view of the apparatus and motor of FIG. 1. Parts are broken away.

Referring first to FIGS. 1 and 2, the new electromagnetic brake apparatus 10 is shown in conjunction with an electric motor 11 of the double-ended type although such apparatus 10 is equally effective with single-ended motors. The illustrated motor 11 has a shaft 13 which connects to the apparatus 10 and another shaft 15 which connects to the load being driven. Connection to such load is usually through a speed reducer.

Figure 5:
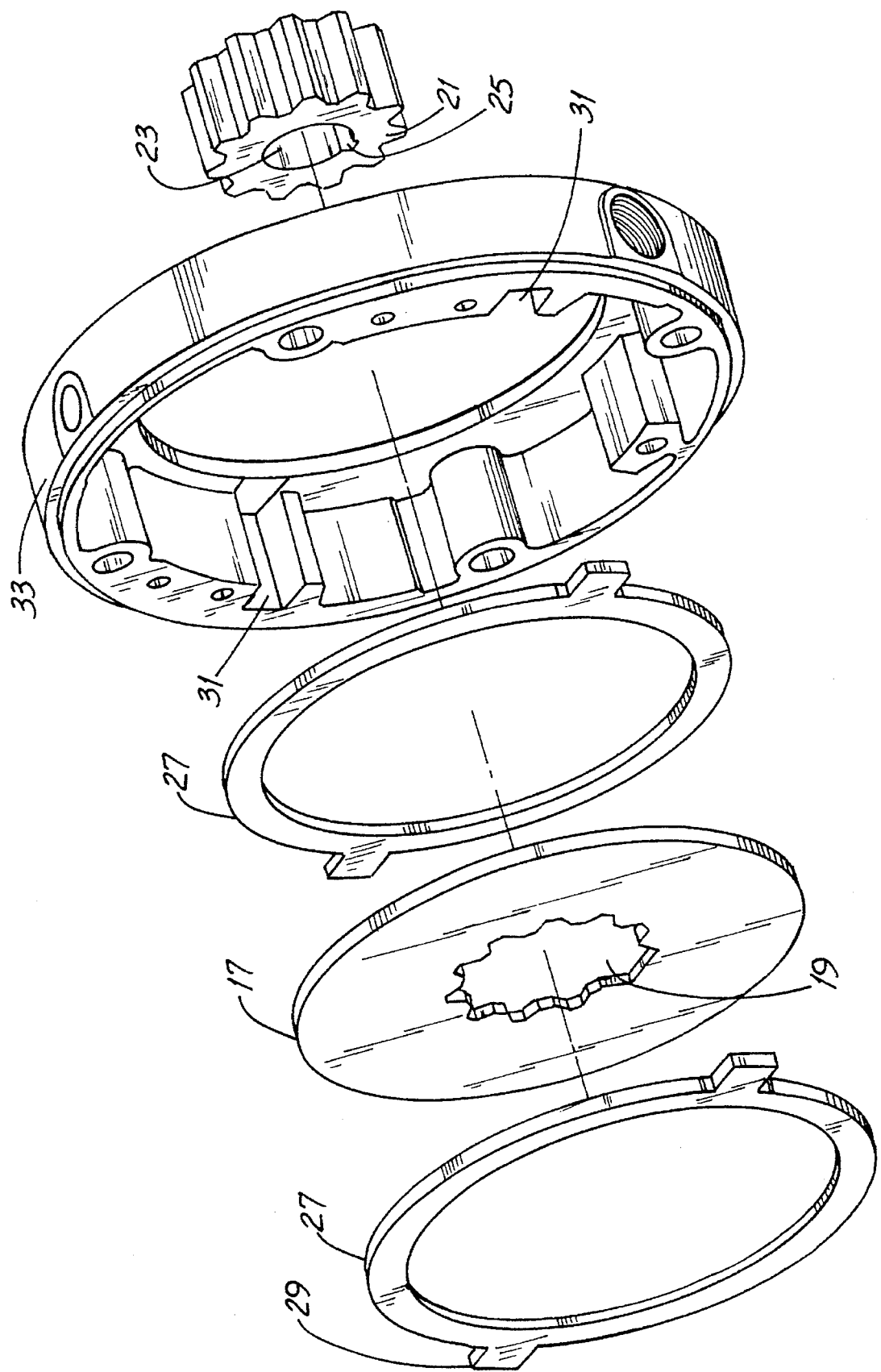
FIG. 5 is an exploded view of the known disk-braking portion of the apparatus.

Referring also to FIG. 5, the apparatus 10 has a friction disc 17 with a splined central aperture 19. A conformably-shaped gear-like piece 21 fits into such aperture 19 and has a central opening 23 with a keyway 25 for attaching the piece 21 to the motor shaft 13. In that way, the piece 21 and the shaft 13 rotate together and, of course, when the disc 17 is braked to a stop, the piece 21 and the shaft 13 stop simultaneously therewith.

The illustrated apparatus 10 also has a pair of annular ring-like discs 27, one on either side of the disc 17 and it is to be appreciated that the invention can also be used with a brake having but a single disc 27. Such discs 27 have radially-projecting tangs 29 which fit into slots 31 in the housing 33. From the foregoing, it is apparent that the discs 27 are free to move longitudinally (left-and-right as viewed in FIG. 2) but are constrained by the tangs 29 from rotating. It is also apparent that when the disc 17 is compressed between the discs 27, the discs 17, 27 exert frictional force on one another and rotation of the disc 17 with respect to the discs 27 is retarded and stopped, thus stopping the motor 11 and holding the load connected thereto. The foregoing general arrangement is known and has been in use for some years.

Figure 3:
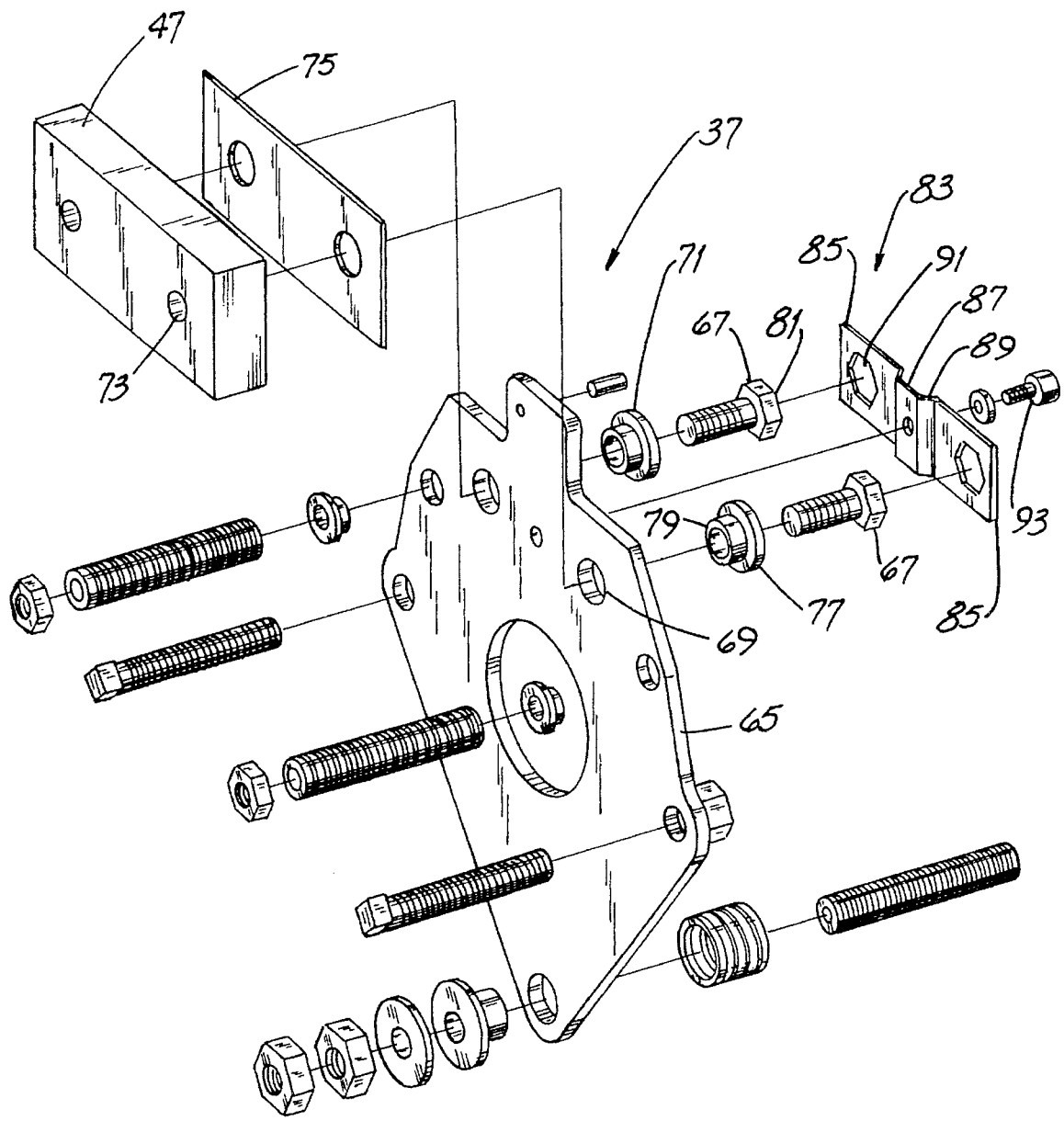
FIG. 3 is an exploded isometric view of the armature assembly of the new apparatus.
Figure 4:
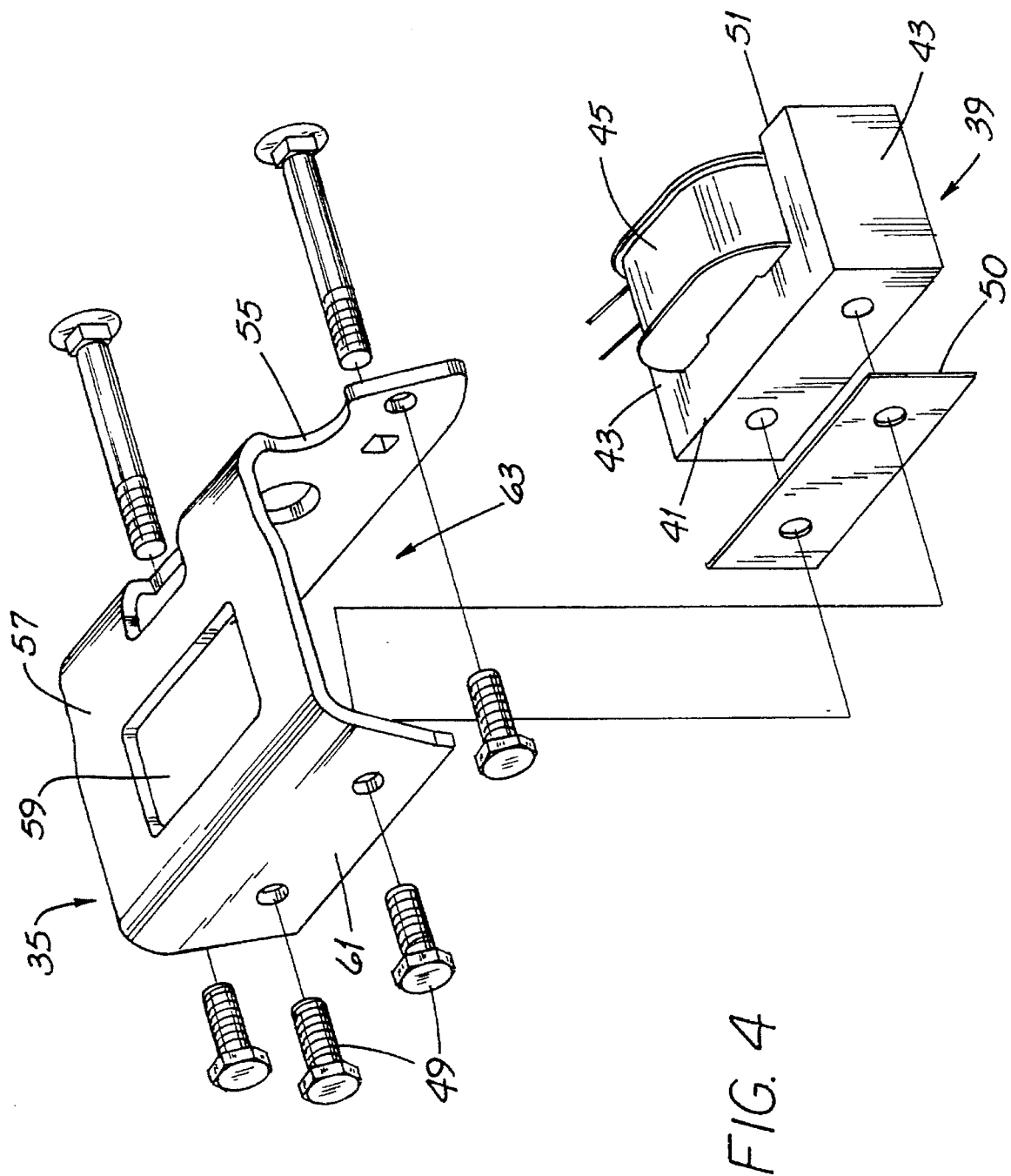
FIG. 4 is an exploded isometric view of the electromagnet and electromagnet support structure of the new apparatus.

Referring also to FIGS. 3 and 4, the improved apparatus 10 includes a new magnet support 35 and a new armature assembly 37. It is to be appreciated that each can be used independently of the other and contribute to noise reduction. However, the new apparatus 10 is most effective in reducing AC hum when both the new support 35 and the new assembly 37 are used in the same electromagnet. The new magnet support 35 will be described first.

Referring particularly to FIGS. 2 and 4, an "E"-shaped electromagnet 39 has a back portion 41 and three spaced legs 43 extending in the same direction from such portion 41. A multi-turn coil 45 is on the center leg 43 and when such coil 45 is connected to a suitable source of electrical power, e.g., the AC lines used to operate the motor 11, the electromagnet 39 exhibits a strong magnetic field and will attract another ferrous object, e.g., an armature block 47, to it with substantial force.

The back portion 41 of the electromagnet 39 is mounted to a cantilever magnet support 35 by bolts 49 using a resilient shock-absorbing pad 50 between the portion 41 and the support 35. The surfaces 51 of the legs 43 are generally flat, coincident with the same plane 53 and define the magnet face.

The magnet support 35 has a foot-like mounting portion 55, a support web 57 extending generally at a right angle from the mounting portion 55 and having an opening 59 therein. A cantilever lip 61 extends from the support web 57 and has the electromagnet 39 attached thereto. In the illustrated embodiment, the mounting portion, the support web 57 and the cantilever lip 61 define a generally C-shaped structure having an open mouth portion 63 and the electromagnet 39 is in the open mouth portion 63.

It should be appreciated that a C-shaped magnet support 35 is but one of other possible configurations for such support 35. Other configurations will function well so long as they permit the magnet 39 supported thereon to change its position slightly when the electromagnet coil 45 is energized. The manner in which the support 35 functions is described in greater detail below.

Figure 6:
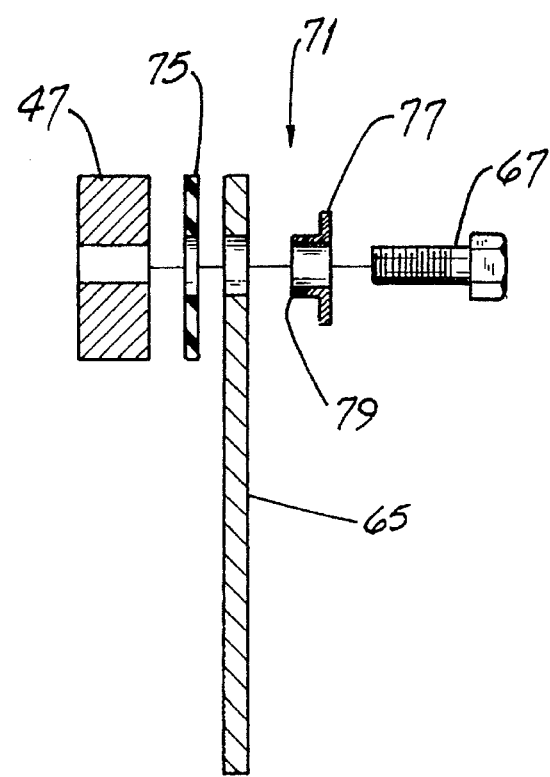
FIG. 6 is a cross-sectional view of a portion of the armature assembly of FIG. 3.

The new armature assembly 37 will now be described. Referring also to FIG. 6, such assembly 37 includes an armature block 47 mounted on an armature plate 65 using a pair of bolts 67. Each bolt 67 extends through a separate hole 69 in the plate 65, through a separate stop 71 and threads into a separate hole 73 in the block 47. A resilient pad 75 is interposed between the block 47 and the plate 65. The block 47 is made of laminated ferrous material and therefore is attracted to the electromagnet 39 with considerable force when the coil 45 is energized.

As best seen in FIGS. 3 and 6, the stop has an enlarged head 77 and a hollow cylindrical body portion 79. The length of the body portion 79 is slightly less than the combined thickness of the plate 65 and the resilient pad 75. From the foregoing, it will be appreciated that as the armature plate 65 and block 47 are drawn toward the electromagnet 39 when the coil 45 is energized, the block 47 is prevented by the stop body portion 79 from fully compressing the pad 75. This arrangement contributes to the efficacy of the invention in reducing AC hum in an electromagnetic brake apparatus 10 because adjustment for parallelism is not as critical as with prior art devices.

Referring again to FIG. 3, another aspect of the new apparatus 10 will now be described. Each of the bolts 67 has a head 81 with a torque-transmitting shape, e.g., square or hexagon but not round. The apparatus 10 has a bolt securing plate 83 with a pair of generally-coplanar end wings 85 and a center support boss 87. The "offset" 89 between the end wings 85 and the surface of the boss 87 is selected so that when the plate 83 is installed, the wings 85 are "belt-like" about midway between the outer and inner surfaces of the respective bolt head 81.

Each wing 85 has an opening 91 in registry with its respective bolt head 81, each such opening 91 being sized and shaped to receive its respective bolt head 81 with slight clearance. After the armature block 47 is securely attached by tightening the bolts 67, each bolt 67 is loosened as and to the extent necessary to place its head 81 in registry with a respective opening 91 of the plate 83. Thereupon, the plate 83 is secured to the plate 65 by a holding screw 93 and the bolts 67 are thereupon prevented from rotating and working loose.

This is a very useful feature since the armature assembly 37 takes a lot of "jarring" as the electromagnet 39 is energized and de-energized. In known arrangements, the repetitive hammer-like impact of the block 47 and the electromagnet 39 tends to loosen bolts to the point that they fall out. The new bolt-holding feature described above substantially resolves problems of that type. The holding screw 93, being out of the path of greatest impact, stays well secured even after repeated cycles.

Referring also to FIGS. 7 and 8, operation of the new apparatus 10 will be described by way of contrast with a prior art magnet support 121. The latter support 121 has a pair of angle brackets 123, each mounted on a rigid standoff stud 125. The electromagnet 127 is held between the brackets 123.

At the instant of energizing the electromagnet 127, the block 133 is attracted to the magnet 127 and makes contact along what may be described as a "line" of contact 135 rather than over an area of contact. AC "hum" results and the magnet 127 and/or block 133 can become "Brinnelled" along the line of contact 135. In other words, there is no opportunity for magnet/block alignment except by more accurate and/or more frequent manual alignment using conventional adjustment screws.

FIGS. 9 and 10 show how the new apparatus 10 permits the leg surfaces 51 and the block 47 to be parallel with one another upon magnet energization even though they are angular with respect to one another (in either of two ways— compare FIGS. 9 and 10) when the magnet 39 is de-energized. In either instance, the cantilever support 35 bends slightly when the coil 45 is energized and the plane 95 of the magnet face becomes angled with respect to a reference plane 97 which is coincident with the plane 95 when the magnet 39 is deenergized. Such support 35 makes it possible for the leg surfaces 51 and surface of the block 47 to become more parallel to one another as the magnet 39 is energized. And the above-described configuration of the armature assembly 37 also makes it possible for the block 47 to become angular with respect to the plate 65 and more parallel to the leg surfaces 51.

While the principles of the invention have been described in connection with specific embodiments, it is to be understood clearly that such embodiments are by way of example and are not limiting.

I claim:

1. In a brake apparatus including an electromagnet mounted on a magnet support and having a magnet face, and an armature block mounted for movement with respect to the electromagnet, and wherein the magnet face is generally coincident with a reference plane when the magnet is de-energized, the improvement wherein:

the electromagnet is an AC magnet;

the magnet support includes a cantilever supporting the armature block; and the magnet support bends slightly when the electromagnet is energized, whereby the magnet face is at an angle to the reference plane when the electromagnet is energized and misalignment between the electromagnet and the block is reduced.

2. The apparatus of claim 1 wherein the magnet support includes:

a mounting portion;

a support web extending from the mounting portion; and the cantilever is a lip extending from the support web and having the electromagnet attached thereto.

3. The apparatus of claim 2 wherein:

the mounting portion, the support web and the lip define a generally C-shaped structure having an open mouth portion; and the electromagnet is in the open mouth portion.

4. The apparatus of claim 1, wherein the armature block is mounted on an armature plate, thereby forming an armature assembly and wherein:

a resilient pad is interposed between the block and the plate;

the assembly includes at least one stop limiting compression of the pad.

5. The apparatus of claim 4 wherein:

the stop has a length;

the pad has an uncompressed thickness; and the thickness of the pad is slightly greater than the length of the stop.

6. The apparatus of claim 1 wherein the armature block is mounted on an armature plate, the armature plate and the armature block are secured to one another by at least one bolt, the bolt has a head with a torque-transmitting shape and wherein:

the assembly also includes a bolt securing plate having an opening in registry with the bolt head and preventing bolt rotation.

7. The apparatus of claim 6 wherein the bolt head and the opening are conformably shaped.

8. In an electromagnet apparatus including an armature assembly mounted for movement with respect to an electromagnet and wherein the armature assembly has an armature plate and an armature block that move in unison when the electromagnet is energized, the improvement wherein:

a resilient pad is interposed between the block and the plate and moves in unison with the block and the plate;

the assembly includes at least one stop limiting compression of the pad; and the stop includes a body portion extending between the block and the plate and contacting the block when limiting pad compression.

9. The apparatus of claim 8 wherein:

the body portion has a length between the block and the plate;

the pad has an uncompressed thickness; and the thickness of the pad is slightly greater than said length.

10. The apparatus of claim 9 wherein the assembly includes an armature plate and an armature block secured to one another by at least one bolt, and the bolt has a head with a torque-transmitting shape and wherein:

the assembly also includes a bolt securing plate having an opening in registry with the bolt head and preventing bolt rotation.

11. The apparatus of claim 9 including an electromagnet mounted on a magnet support and having a magnet face and wherein:

the magnet face is generally coincident with a reference plane when the magnet is de-energized;

the magnet support includes a cantilever and bends slightly when the electromagnet is energized, whereby the magnet face is at an angle to the reference plane when the electromagnet is energized and misalignment between the electromagnet and the assembly is reduced.

12. In a brake apparatus including an electromagnet mounted on a magnet support and having a magnet face, and an armature block mounted for movement with respect to the electromagnet, and wherein the magnet face is generally coincident with a reference plane when the magnet is de-energized, the improvement wherein:

the magnet support includes a mounting portion, a support web extending from the mounting portion, and a cantilever lip extending from the support web and having the electromagnet attached thereto; and the magnet support bends slightly when the electromagnet is energized, whereby the magnet face is at an angle to the reference plane when the electromagnet is energized and misalignment between the electromagnet and the block is reduced.

13. The apparatus of claim 12 wherein:

the mounting portion, the support web and the cantilever lip define a generally C-shaped structure having an open mouth portion; and the electromagnet is in the open mouth portion.

14. In a brake apparatus including an electromagnet mounted on a magnet support and having a magnet face, and an armature block mounted for movement with respect to the electromagnet, and wherein the magnet face is generally coincident with a reference plane when the magnet is de-energized, the improvement wherein:

the armature block is mounted on an armature plate, thereby forming an armature assembly;

a resilient pad is interposed between the block and the plate;

the assembly includes at least one stop limiting compression of the pad;

the magnet support includes a cantilever and bends slightly when the electromagnet is energized, whereby the magnet face is at an angle to the reference plane when the electromagnet is energized and misalignment between the electromagnet and the block is reduced.

15. The apparatus of claim 14 wherein:

the stop has a length;

the pad has an uncompressed thickness; and the thickness of the pad is slightly greater than the length of the stop.

16. In a brake apparatus including an electromagnet mounted on a magnet support and having a magnet face, and an armature block mounted for movement with respect to the electromagnet, and wherein the magnet face is generally coincident with a reference plane when the magnet is de-energized, the improvement wherein:

the armature block is mounted on an armature plate;

the armature plate and the armature block are secured to one another by at least one bolt which has a head with a torque-transmitting shape;

the assembly also includes a bolt securing plate having an opening in registry with the bolt head and preventing bolt rotation; and the magnet support includes a cantilever and bends slightly when the electromagnet is energized, whereby the magnet face is at an angle to the reference plane when the electromagnet is energized and misalignment between the electromagnet and the block is reduced.

17. The apparatus of claim 16 wherein the bolt head and the opening are conformably shaped.

18. In an electromagnet apparatus including an armature assembly mounted for movement with respect to an electromagnet and wherein the armature assembly has an armature plate and an armature block, the improvement wherein:

a resilient pad having an uncompressed thickness is interposed between the block and the plate;

the assembly includes at least one stop limiting compression of the pad;

the stop has a length between the block and the plate which is slightly less than the uncompressed thickness of the pad;

the plate and the block are secured to one another by at least one bolt having a head with a torque-transmitting shape; and the assembly also includes a bolt-securing plate having an opening in registry with the bolt head and preventing bolt rotation.

19. The apparatus of claim 18 including an electromagnet mounted on a magnet support and having a magnet face and wherein:

the magnet face is generally coincident with a reference plane when the magnet is de-energized;

the magnet support includes a cantilever and bends slightly when the electromagnet is energized, whereby the magnet face is at an angle to the reference plane when the electromagnet is energized and misalignment between the electromagnet and the assembly is reduced.

20. In an electromagnet apparatus including an armature assembly mounted for movement with respect to an electromagnet and wherein the armature assembly has an armature plate and an armature block, the improvement wherein:

a resilient pad having an uncompressed thickness is interposed between the block and the plate;

the assembly includes at least one stop limiting compression of the pad;

the stop has a length between the block and the plate which is slightly less than the uncompressed thickness of the pad;

the electromagnet is mounted On a magnet support and has a magnet face generally coincident with a reference plane when the magnet is de-energized; and the magnet support includes a cantilever and bends slightly when the electromagnet is energized, whereby the magnet face is at an angle to the reference plane when the electromagnet is energized and misalignment between the electromagnet and the assembly is reduced.

* * * * *